(12) United States Patent
Wohlgenannt

(10) Patent No.: US 9,145,239 B2
(45) Date of Patent: Sep. 29, 2015

(54) SPOUT, METHOD FOR PRODUCING A SPOUT AND CONTAINER CLOSURE COMPRISING SUCH A SPOUT

(75) Inventor: Herbert Wohlgenannt, Schaffhausen (CH)

(73) Assignee: CAPARTIS AG, Schaffhausen (CH)

( * ) Notice: Subject to any disclaimer, the term of this patent is extended or adjusted under 35 U.S.C. 154(b) by 24 days.

(21) Appl. No.: 13/995,885

(22) PCT Filed: Dec. 21, 2011

(86) PCT No.: PCT/EP2011/073689
§ 371 (c)(1),
(2), (4) Date: Jun. 19, 2013

(87) PCT Pub. No.: WO2012/085153
PCT Pub. Date: Jun. 28, 2012

(65) Prior Publication Data
US 2013/0299511 A1    Nov. 14, 2013

(30) Foreign Application Priority Data
Dec. 21, 2010    (EP) .................................. 10196361

(51) Int. Cl.
*B67D 1/00*    (2006.01)
*B65D 47/12*    (2006.01)
*B65D 5/74*    (2006.01)
*B29C 65/08*    (2006.01)

(52) U.S. Cl.
CPC .............. *B65D 47/122* (2013.01); *B29C 65/08* (2013.01); *B65D 5/748* (2013.01); *Y10T 156/10* (2015.01)

(58) Field of Classification Search
CPC ...... B65D 5/748; B65D 47/122; B29C 65/08; Y10T 156/10

USPC .......... 222/83, 153.05, 153.06, 541.1, 541.2, 222/551, 566; 220/256.1, 258.1, 258.3, 220/258.4, 366.1
See application file for complete search history.

(56) References Cited

U.S. PATENT DOCUMENTS

| 3,260,411 | A | * | 7/1966 | Dobson ......................... | 222/107 |
| 4,362,255 | A | * | 12/1982 | Bond ............................. | 222/107 |
| 4,948,015 | A | * | 8/1990 | Kawajiri et al. .............. | 222/107 |
| 5,141,133 | A | * | 8/1992 | Ninomiya et al. .............. | 222/83 |
| 5,147,070 | A | * | 9/1992 | Iwamoto ......................... | 222/83 |

(Continued)

FOREIGN PATENT DOCUMENTS

| DE | 102005013902 | 4/2006 |
| GB | 2408040 | 5/2005 |

(Continued)

OTHER PUBLICATIONS

International Search Report for International Application No. PCT/EP2011/073689 mailed Sep. 4, 2012.

*Primary Examiner* — Patrick M Buechner
(74) *Attorney, Agent, or Firm* — Pearl Cohen Zedek Latzer Baratz LLP

(57) ABSTRACT

A spout (1) has a spout part (3) with a spout opening (3a), the spout also has a flange part (2) that is connected to the spout part (3), said flange part (2) having two faces, a fixing face (2k) and a rear face (2i). The fixing face (2k) is oriented towards the spout part (3) and is provided for fixing to a composite package (6). An oxygen-impermeable foil (8) lies on the rear face (2i) of the flange part (2) and is welded to the rear face (2i) such that the spout opening (3a) is sealed towards the rear face (2i) by the foil (8).

21 Claims, 8 Drawing Sheets

(56) References Cited

U.S. PATENT DOCUMENTS

| | | | |
|---|---|---|---|
| 5,297,696 A * | 3/1994 | Bernstein et al. | 222/83 |
| 5,482,176 A * | 1/1996 | Maietta et al. | 220/277 |
| 5,947,318 A * | 9/1999 | Palm | 220/278 |
| 6,398,075 B1 * | 6/2002 | Laciacera et al. | 222/91 |
| 7,458,486 B2 * | 12/2008 | Weist et al. | 222/83 |
| 7,841,484 B2 * | 11/2010 | Kaneko et al. | 220/277 |
| 7,886,922 B2 * | 2/2011 | Seelhofer | 215/297 |
| 2002/0179605 A1 * | 12/2002 | Miani et al. | 220/277 |
| 2009/0020558 A1 * | 1/2009 | Bolli | 222/83 |
| 2009/0302037 A1 * | 12/2009 | Rigling | 220/258.4 |

FOREIGN PATENT DOCUMENTS

| | | |
|---|---|---|
| JP | H10245062 | 9/1998 |
| WO | WO2007132021 | 11/2007 |

* cited by examiner

SPOUT, METHOD FOR PRODUCING A SPOUT AND CONTAINER CLOSURE COMPRISING SUCH A SPOUT

CROSS-REFERENCE TO RELATED APPLICATIONS

This application is a National Phase Application of PCT International Application No. PCT/EP2011/073689, International Filing Date Dec. 21, 2011, claiming priority of European Patent Application No. 10196361.9, filed Dec. 21, 2010, which is hereby incorporated by reference.

DESCRIPTION

The invention relates to a spout in accordance with the preamble of claim 1. The invention further relates to a method of manufacturing a spout in accordance with the preamble of claim 13. The invention further relates to a container closure in accordance with claim 20.

BACKGROUND OF THE INVENTION

The document U.S. Pat. No. 6,279,779 discloses a re-sealable container closure, which is suitable for the closing of food containers, in particular food containers composed of a laminated layered material, also referred to as a laminated package. In order to store food, such as, for example UHT milk (ultra-high-temperature processed milk) on a long-term basis in such a laminated package, an aseptic package is required. Such an aseptic package comprises an oxygen impermeable layer. Such a barrier layer is preferably formed of aluminum, wherein the layered material and/or the film package is typically configured such that an aluminum film or an aluminum foil is coated at the outside and the inside with at least one plastic layer, such that the plastic layer forms the inner surface of the laminated package with which the food present in the laminated package comes into contact. In order to be able to comfortably open such a laminated package, this is provided with a predetermined breaking point at the position of opening, wherein a container closure is arranged in the region of the predetermined breaking point at the outer surface of the laminated package and wherein the container closure has a cutting edge which, on a rotation of the container closure, moves downwardly and in this connection cuts through the predetermined breaking point, such that an opening arises in the layered material, which forms an access to the interior of the laminated package via the container closure.

Such a container closure has the disadvantage that the laminated package has to be manufactured in a manner relatively demanding in effort and cost, since such predetermined breaking points have to be provided. Moreover, the barrier layer is not allowed to be damaged. Moreover, the closure has to be adhesively bonded in an exact position at the outer side of the laminated package leading to an additional work step, as well as to the use of adhesive.

The document GB 2 408 040 A discloses a further container closure. This container closure has the disadvantage that, on the first opening, a screw lid must be removed in a first step and subsequently in a second step a pulling ring has to be found and one has to tag the pulling ring in order to pull out a removable part from the container closure. For this reason the opening of this container closure is very laborious and requires a little force and dexterity.

The document DE 10 2005 013 902 B3 discloses a container closure having a separable film, wherein the film has a weakening line such as a perforation for the simplified separation. A disadvantage of this container closure is that this is not suitable for the aseptic packaging of food.

SUMMARY OF THE INVENTION

It is an object of the invention to provide an advantageous spout which is economically more advantageous and which is, in particular also suitable for aseptic laminated packages.

This object is satisfied by a spout having the features according to aspects of certain embodiments of the present invention. The object is further satisfied by a method of manufacturing the spout in accordance with certain embodiments of the present invention. The object is further satisfied by a container closure comprising the features according to aspects of certain embodiments of the present invention. The object is further satisfied by a semi-finished product having the features according to aspects of certain embodiments of the present invention.

The object is, in particular satisfied by a spout comprising a spout part, having a spout opening, as well as comprising a flange part connected to the spout part, wherein the flange part has two sides, an attachment side, as well as a rear side, wherein the attachment side is oriented towards the spout part and is provided for the attachment at a laminated package, and wherein an oxygen-impermeable film is arranged at the rear side of the flange part and welded to the rear side, such that the spout opening is sealed towards the rear side by the film. For this purpose the term "film" means a film package, wherein the oxygen-impermeable film, preferably comprises a layered material including aluminum.

The object is further, in particular satisfied by a method of manufacturing a spout comprising a spout part having a spout opening, as well as comprising a flange part connected to the spout part, wherein the flange part has two sides, an attachment side as well as a rear side, wherein the attachment side is oriented towards the spout part, wherein a nose part extending in the circumferential direction and projecting over the rear side of the end is generated at the rear side, and wherein a film, which also covers the spout opening is arranged in a region of the rear side enclosed by the nose part, wherein the film has an end section oriented towards the nose part, and wherein the nose part is transformed to a sealed part, such that the sealed part encloses the end section in the circumferential direction and the end section of the film is welded into the flange part. A thermoplast is preferably used as a plastic for the manufacture of the spout part. The deforming of the nose part preferably takes place by means of an ultrasonic welding method, in particular by a torsional ultrasound welding method or by a longitudinal ultrasound welding method, in order to deform the projecting nose part to a sealed part, which contacts the film at both sides at the end section and moreover lies at the end face of the end section of the film, in order to connect the film to the spout in a gas-tight manner by ultrasonic welding. In this connection, in particular also the end face of the film, at which aluminum can be present, is welded in gas-tight in the flange part. Advantageously the sonotrode, by means of which the sealed part is formed, has a curved extent, advantageously such that a bead-like sealed part is formed.

The object is further, in particular satisfied by a container closure comprising the spout in accordance with the invention, as well as comprising a screw cover having an inner thread and an axis of rotation, as well as comprising a cutting part which is arranged within the spout part, wherein the cutting part has an outer thread and the spout has an inner thread which engage one another and are configured such that the cutting part is moved in the direction of the axis of rotation towards the film on opening of the screw cover, wherein the screw cover has an engagement part, and wherein the cutting part and the screw cover are configured mutually adapted such that the engagement part transfers a torque onto the cutting part.

The spout in accordance with the invention has the advantage that the end section, as well as the end face of the film is welded gas-tight in the flange part.

The spout in accordance with the invention has the advantage that this seals the inlet opening and/or the spout opening of a spout with the aid of a film in an oxygen-impermeable manner and/or seals it shut. In this connection the film is fixedly welded to the spout and thus forms a part of the spout. This in turn provides the possibility of providing a laminated package with a punching, such as a hole, wherein the spout can be introduced into the hole from the inner side, and wherein the flange part can be welded to the inner side of the laminated package such that the spout is fixedly connected to the laminated package. The laminated package comprises, in a preferred embodiment, an oxygen-impermeable film, wherein also the spout in accordance with the invention has an oxygen-impermeable film, so that in a preferred design the overall wall of the laminated package including the hole is provided with an oxygen-impermeable film by means of the spout. Thus, it is no longer required, as is currently the case, to provide an opening position with a predetermined breaking point at an oxygen-impermeable laminated package and to adhesively bond a container closure in the region of the predetermined breaking point at the outer surface of the laminated package. The opening point of such a laminated package typically comprises also cardboard or paper parts for which reason an increased force is required in order to open the opening point. The spout in accordance with the invention has the advantage that the used film which seals the spout opening can be of relatively thin design and that this film, in particular does not have to comprise cardboard or paper parts, so that this film can be opened with a relatively small force.

It is generally known to provide laminated packages with a hole and to introduce a spout from the inner side into the hole and to weld the spout via its flange part to the inner side of the laminated package. Such a laminated package of the spout has the disadvantage that this is oxygen-permeable and thus not suitable for certain food. In an advantageous embodiment the spout in accordance with the invention has the same geometrical dimensions as a known spout, at least with respect to the outer diameter of the spout part, which results in the advantage that the spout in accordance with the invention can be used at the same package plant as a so-far used spout. This in turn provides the advantage that an aseptic package is now possible at a package plant with which one was so far not able to aseptically package thanks to the spout in accordance with the invention and on use of a corresponding laminated package comprising an oxygen-impermeable layer.

BRIEF DESCRIPTION OF THE FIGURES

The drawings used for the explanation of the embodiments show.

Principally, the same parts are referred to using the same reference numerals in the drawing.

DETAILED DESCRIPTION OF THE INVENTION

Figure 1:
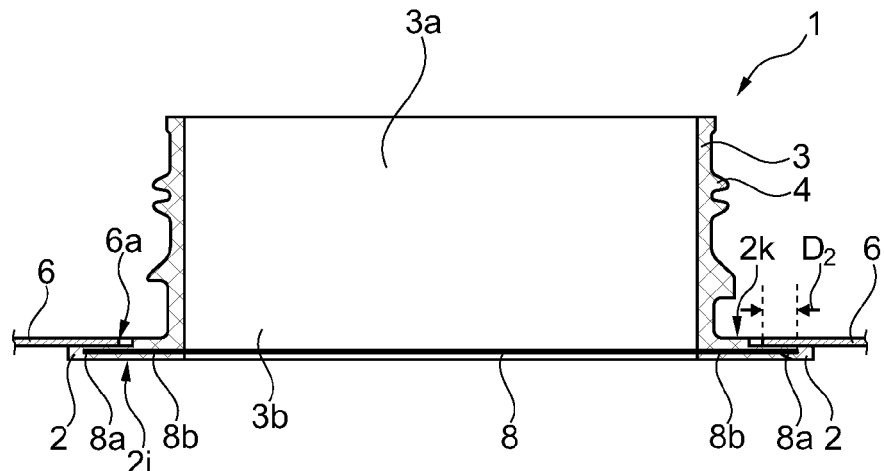
FIG. 1 a cross-section through two possible embodiments of spout.

FIG. 1 shows a spout 1 comprising a spout part 3, having an outer thread 4 and having an inlet opening 3b as well as a spout opening 3a, as well as comprising a flange part 2 connected to the spout part 3, wherein the flange part 2 has two sides, an attachment side 2k as well as a rear side 2i, wherein the attachment side 2k is oriented towards the spout part 3 and can be welded to a laminated package 6 for fastening. Such a spout 1, without the elements referred to as 8 and 8b is known and is used in combination with compound material 6 which is provided with a pre-punched hole 6a, through which hole the spout 1 is introduced and subsequently adhesively bonded to the inner side of the compound material 6. Such a spout 1 comprises a tubular spout part open at both sides.

FIG. 1 moreover shows a first embodiment of a spout 1 in accordance with the invention which in addition to the previously described spout has a film 8 having end sections 8b, wherein the end section 8b ends at an end face 8a, wherein both the left and also the right illustrated end sections 8b are welded above and below, this means at both sides and in the region of the rear side 2i of the flange part 2. The film having the end sections 8b and the end face 8a is welded to the flange part 2 over the overall circumference in the circumferential direction, such that the spout opening 3a and/or the inlet opening 3b are sealed with respect to the rear side 2i by the film 8, preferably sealed in a gas-tight manner. The gas-tight seal is preferably brought about by means of ultrasonic welding. In a preferred embodiment, the end sections 8b and the laminated package 6 are arranged mutually such that these overlap over a distance D2, in particular in order to prevent or to reduce a diffusion of oxygen from the outside into the interior of the laminated package seal 6.

It can, in particular also be seen from FIG. 1 that the spout in accordance with the invention, in a possible embodiment, can have substantially the same geometric dimensions, as a so-far known spout which results in the advantage that the spout in accordance with the invention can be used in combination with already known laminated packages and that the spout in accordance with the invention can be used in already existing package plants. In this connection it is particularly advantageous that, thanks to the spout in accordance with the invention, now also aseptic containers can be manufactured at package plants at which so far no aseptic container could be produced, provided the layer material used for the laminated package has an oxygen-impermeable layer.

Figure 2:
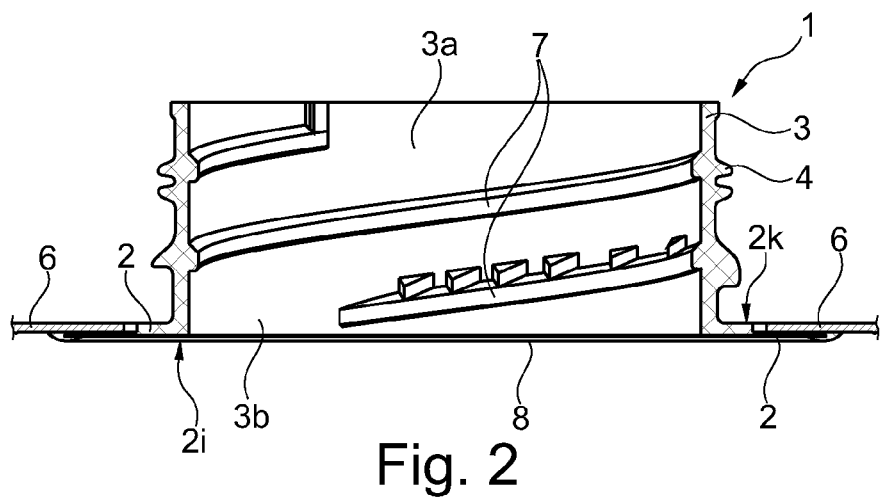
FIG. 2 a cross-section through the spout in accordance with the invention along the sectional line A-A.

FIG. 2 shows a further embodiment of a spout 1 which moreover has an inner thread 7 in the inner space 3a. At the rear side 2i of the flange part 2 an oxygen-impermeable film 8 is arranged which is at least partially welded to the surface or within the rear side 2i, wherein the weld extends over the entire circumference of the flange part 2, so that the spout opening 3a and/or the inlet opening 3a is sealed with respect to the rear side 2i by the film 8 covering the overall spout opening 3a and/or the inlet opening 3a.

Figure 3:
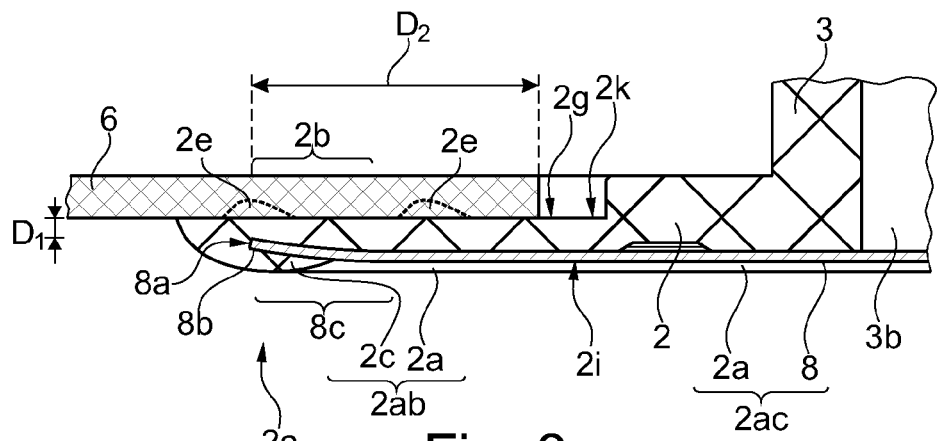
FIG. 3 a detailed view of the spout illustrated in FIG. 2.

FIG. 3 shows a detailed view of the left side of the spout 1 illustrated in FIG. 2. The flange part 2 has a recess 2g at the attachment side 2k which is intended for the reception of the laminated package 6. The end section 8b of the film 8 is arranged extending into the flange part 2, for example, in the form of a curved extending section 8c, such that the spacing between the end section 8b and the fastening section 2k reduces in the direction towards the periphery of the flange part 2. In order to achieve this the flange part 2 has a thickness reducing towards the periphery in an advantageous embodiment, such that the mutual spacing between the fastening section 2k and the rear side 2i reduces. Particularly advantageously, the end section 8b is designed inclined or extending curved with respect to the attachment side 2k, wherein the surface of the recess 2g advantageously extends straightlined. The nobs 2e thus represent so-called energy-direction actors which project over the surface of the recess 2g prior to the welding of the flange part 2 to the laminated package 6, wherein these nobs 2g melt during the welding, e.g. during the ultrasonic welding of the flange part 2 and the laminated package 6, such that the nobs 2e are no longer visible in the illustrated arrangement, which is why the nobs 2e are only illustrated in a doted manner. The end section 8b of the film 8 ends at an end face 8a, wherein the distance D1 between the attachment side 2k and/or the recess 2g and the end face 8a lies in the range of up to 0.5 mm and preferably lies in the range between up to and including 0.1 and 0.3 mm. The distance D1 could, however, also lie in the range of up to 1 mm. A smaller distance D1 has the advantage that at this position no or only a very little amount of oxygen can penetrate from the outside into the inner space of the laminated package 6. Advantageously, the flange part 2 is configured such that the laminated package 6 is welded to the attachment side 2k and/or the recess 2g and the film 8 arranged at the rear side 2i overlap with respect to the flange part 2 in the radial direction mutually by distance D2 of at least 1 mm, preferably overlap by a distance of up to 5 mm or up to 10 mm. A larger distance D2 has the advantage that it is more difficult for oxygen to penetrate the inner space of the laminated package 6 from the outside. In a particularly advantageous arrangement thus a small distance D1 and a large distance D2 are selected in order to hinder or prevent the penetration of oxygen.

The flange part 2 has a weld 2a at which after finishing the welding process a sealed part 2c is formed, such that the end section 8b of the film 8 is arranged in the region of the sealed part 2c at both sides in the flange part 2 and the end face 8a of the end section 8b, as well as the end section 8b is enclosed by the sealed part 2c. The film 8 is preferably configured as a layered material and has a barrier layer preferably an aluminum layer. The aluminum layer is preferably covered on both sides with at least a plastic layer, wherein the aluminum layer can contact at the end face 8a at the surface of the film 8. The end side 8a, as well as the end section 8b are arranged within the sealed part 2 in a gas-tight manner. In a particularly advantageous embodiment the sealed part 2c has a curved extent, advantageously a bead-like extent. The gas-tight welding with respect to the sealed part 2c takes place by means of ultrasound.

Figure 5:
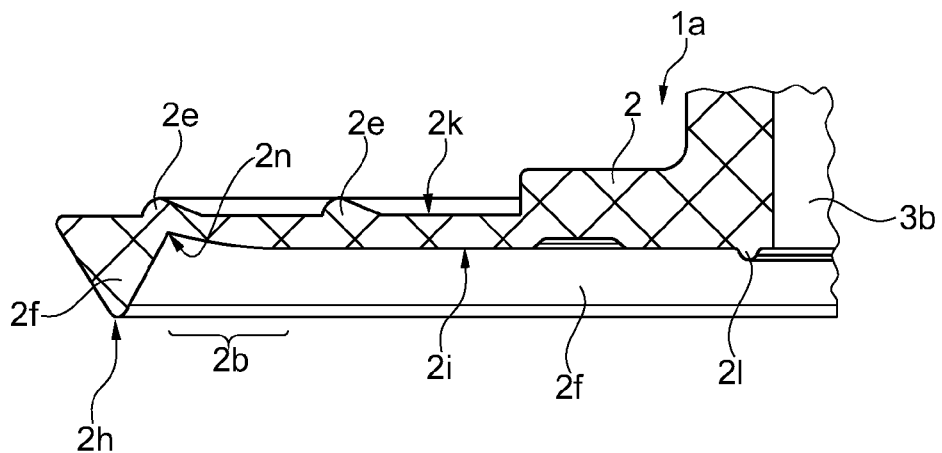
FIG. 5 a detailed view of the intermediate product illustrated in FIG. 4.

The weld 2a extends, as partly viewable, over the entire circumference of the flange part 2, such that a tight connection, in particular a gas-tight connection, between the flange part 2 and the film 8 is formed. Advantageously at least one further weld is provided between the flange part 2 and the film 8, which is indicated by a first weld 2ac, as well as by a second weld 2ab which are illustrated as a region. The first or second weld 2ac, 2ab likewise extend over the entire circumferential direction of the flange part 2. The first weld 2ac is arranged in the region of the inlet opening 3b and extends along the entire circumference of the rear side 2i. For a secure welding of the film 8 to the flange part 2, as illustrated in FIG. 5, an energy directing actor 21 and/or a nob 21 is provided in order to connect the film 8 in the region of the inlet opening 3b to the rear side 2i. This first weld 2ac is, in particular of importance also for the reason that the film 8 is separated by a cutting edge, in a preferred embodiment, which cutting edge acts on the film 8 from the side of the spout part 3. The first weld 2ac thus holds the film 8 in a defined position with respect to the boundary of the inlet opening 3b enabling a particularly precise separation of the film 8 with a cutting edge, since the film 8 cannot or can only marginally escape back.

Figure 4:
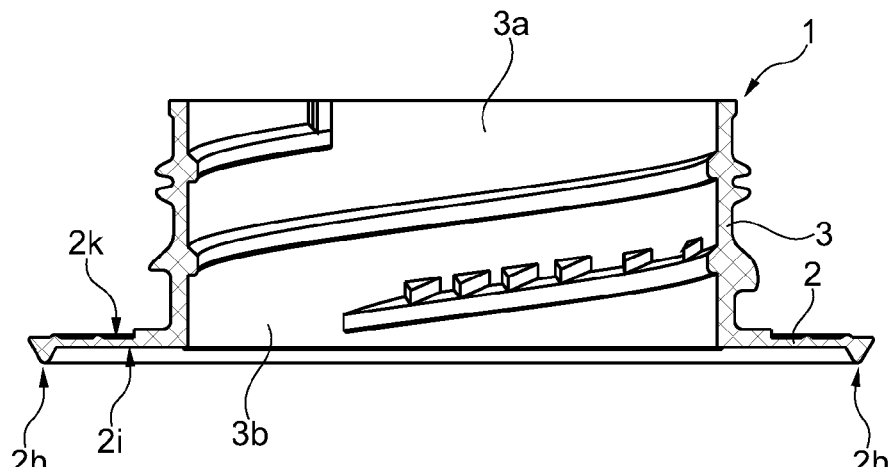
FIG. 4 a cross-section through an intermediate product of the spout in accordance with the invention.

FIG. 4 shows a section through an intermediate product 1a of the spout 1 prior to the welding of the film 8. The intermediate product 1a will subsequently also be referred to as a semi-finished product 1a. FIG. 5 shows the left side of the intermediate product 1a of the spout 1, as illustrated in FIG. 4, in detail. The flange 2 has a nose part 2 extending along the entire circumference and projecting with respect to the rear side 2i which nose part 2f forms a weld point 2h in the not yet welded state. The rear side 2i moreover has a curved extending section 2b. At the attachment side 2k circularly surrounding nobs 2e are arranged which are configured as an energy directing actor 2e which, amongst other things, serves for the welding to the package 6. In a particularly advantageous embodiment the thinnest point 2n which, in the illustrated embodiment is configured as an inflection point, is arranged opposite an energy directing actor 2e which brings about the advantage that the injection mold by means of which the intermediate product 1a illustrated in FIG. 1 is preferably produced forms a wide passage in the region of the thinnest point 2n, such that the supply of injection molded material into the projecting nose part 2f is ensured. This enables the manufacture of an intermediate product 1a having a particularly small distance between the attachment side 2k and the thinnest point 2n.

The spout 1 in accordance with the invention is manufactured in an advantageous method such that a spout 1 is manufactured as an intermediate product 1a which at the rear side 2i, as illustrated in FIGS. 4 and 5, has a nose part 2f extending in the circumferential direction, projecting over the rear side 2i, wherein in a subsequent method step a film 8 which also covers the spout opening 3a and/or the inlet opening 3b, is arranged in the region of the rear side 2i enclosed by the nose part 2f. The film 8 has the end section 8b oriented towards the nose part 2f. In a subsequent method step the nose part 2f is deformed by means of ultrasonic welding, as illustrated in FIG. 3, to a sealed part 2c such that the sealed part 2c encloses the end section 8b in the circumferential direction and the section 8b together with the end face 8a is welded together with the film 8 at both sides in the flange part 2.

In a particularly advantageous method the flange part 2 is generated with a thickness reducing towards the nose part 2f, so that the distance D1 between the film 8 and the attachment side 2k reduces for a welded film 8 at least in the region of the sealed part 2c. Particularly advantageously the rear side 8a is formed with a surface extending curved in the direction towards the nose part 2f.

Figure 6:
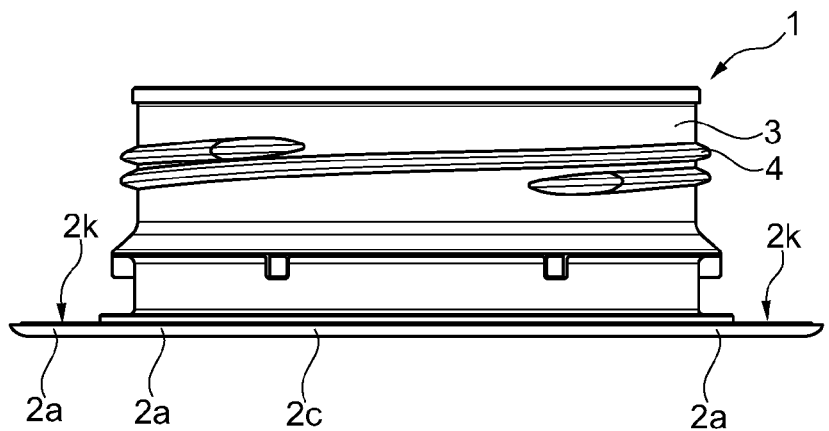
FIG. 6 a side view of the spout in accordance with the invention.
Figure 7:
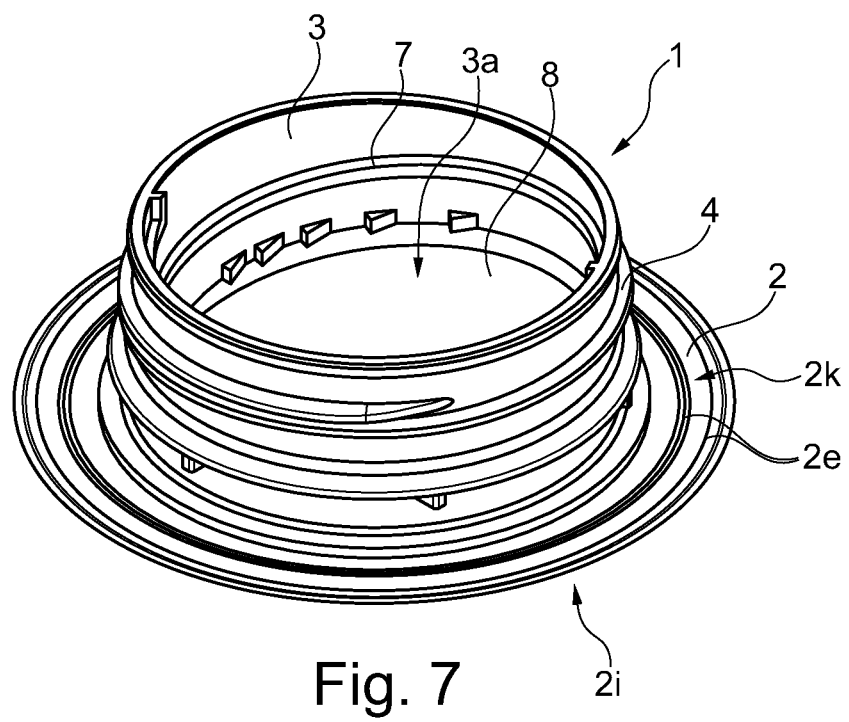
FIG. 7 a perspective view of the spout in accordance with the invention.
Figure 8:
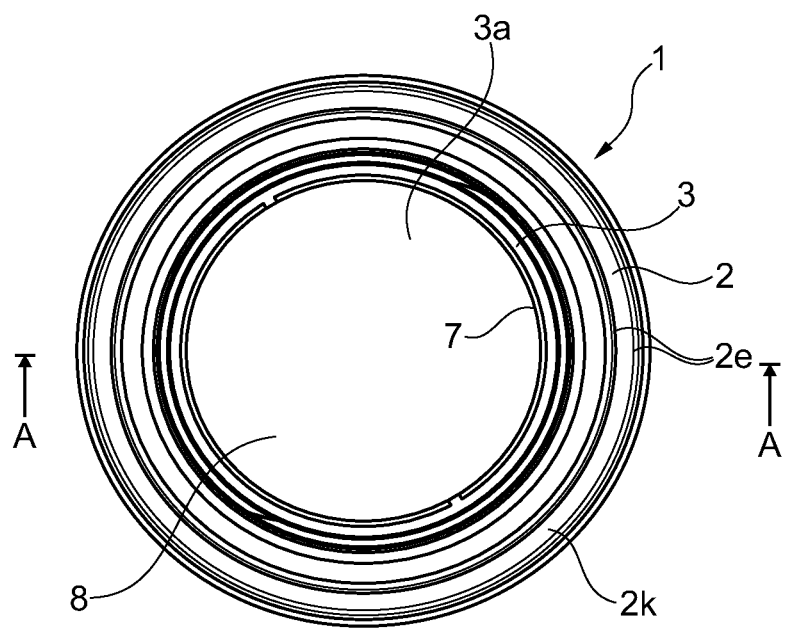
FIG. 8 a top view of the spout in accordance with the invention.
Figure 9:
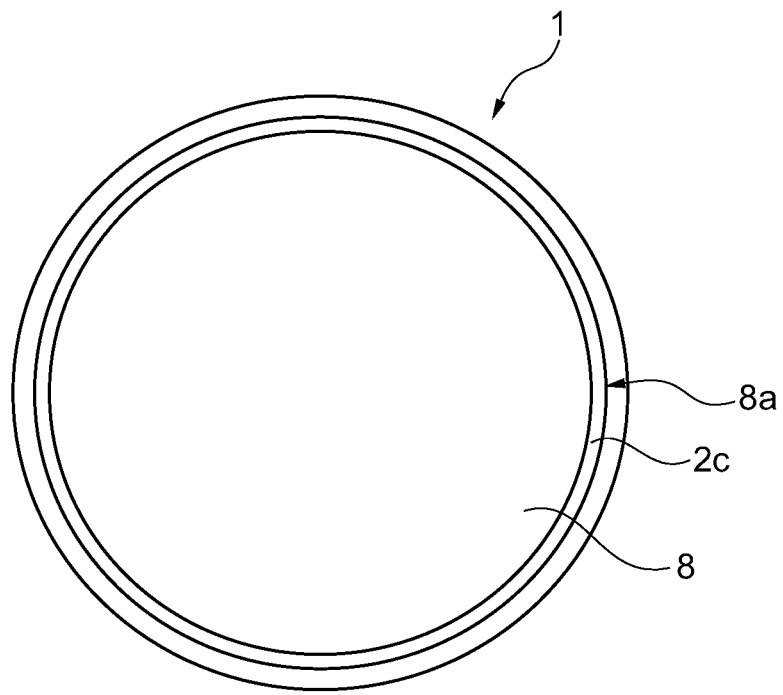
FIG. 9 a view from below of the spout in accordance with the invention.

FIG. 6 shows the completed spout 1 comprising the welded film 8 in a side view, wherein, in particular also the bead-like weld 2a extending in the circumferential direction and/or the sealed part 2c is illustrated. FIG. 7 shows the completed spout 1 in a perspective view. FIG. 8 in a view from above and FIG. 9 in a view from below. The FIGS. 2 and 3 show the completed spout 1 along the sectional line A-A in accordance with FIG. 8.

Figure 10:
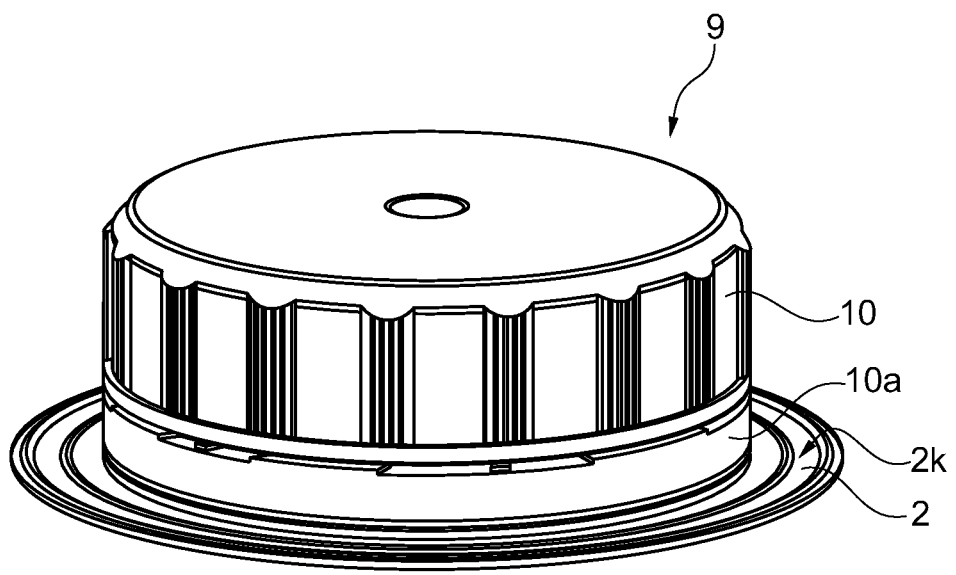
FIG. 10 a perspective view of a closure comprising the spouts in accordance with the invention.
Figure 11:
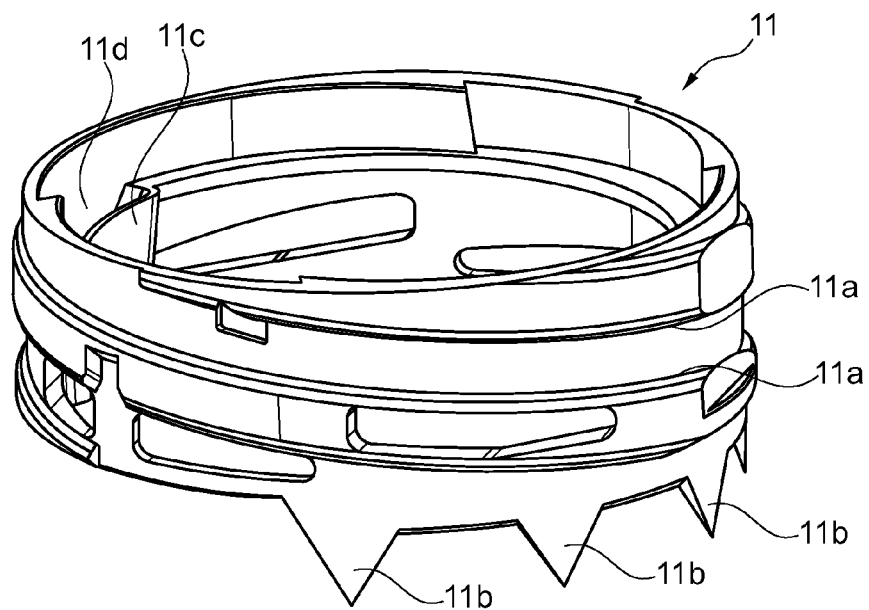
FIG. 11 a perspective view of a cutting part of the closure in accordance with FIG. 10.
Figure 12:
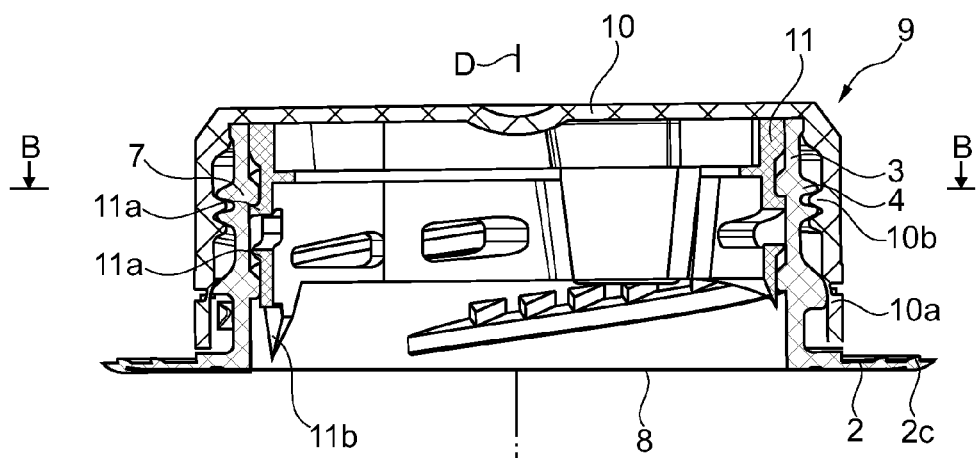
FIG. 12 a cross-sectional view to the closure in accordance with FIG. 10.
Figure 13:
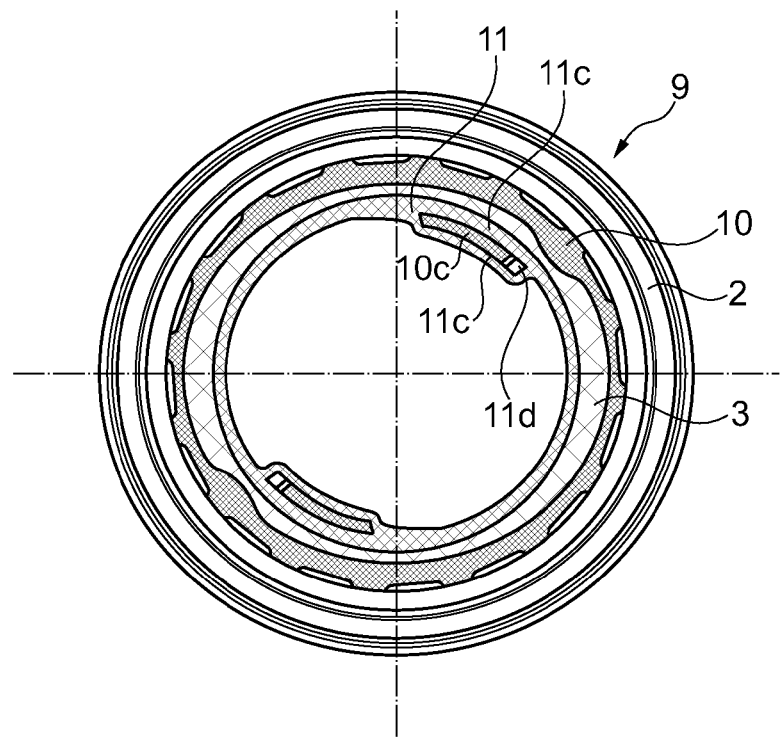
FIG. 13 a cross-section through the closure in accordance with FIG. 10 along the sectional line B-B.
Figure 14:
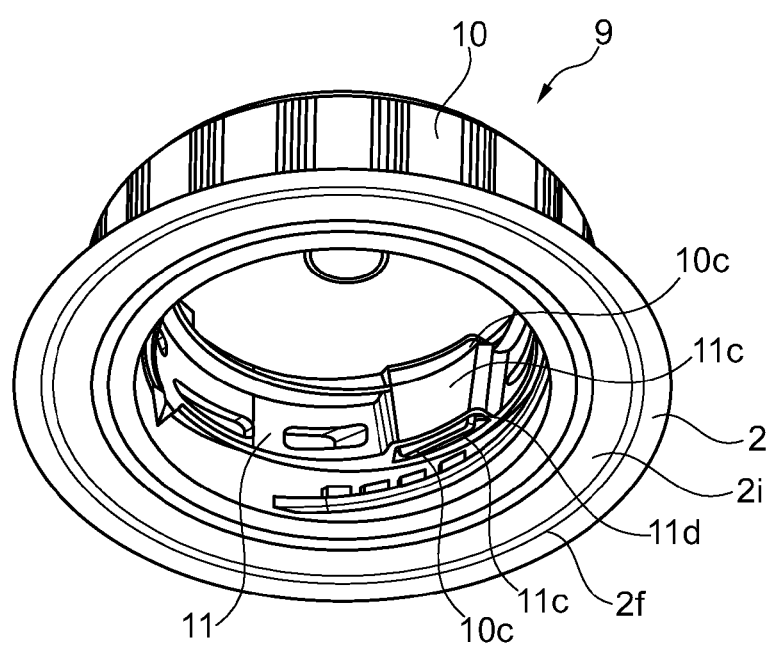
FIG. 14 a perspective inner view of a closure.

The spout 1 in accordance with the invention can be combined to a container closure 9 in a plurality of embodiments. The FIGS. 10 to 14 and 16 show a possible embodiment of a container closure 9 and its part components by way of example. The container closure 9 and its part components preferably are composed of a plastic, wherein the film 9 comprises a barrier layer of metal such as aluminum. FIG. 10 shows a perspective view of a closed container closure 9, wherein a screw cover 10 is visibly illustrated with a warranty band 10a and a flange 2. Advantageously, the container closure 9 in this arrangement is welded via the attachment side 2k to a package and/or to a container wall. FIG. 11 shows, in a perspective view, an embodiment of a cutting element 11 comprising an outer thread 11a, a plurality of cutting edges 11b, a cutting wall part 11c and a longitudinal guide 11d. FIG. 12 shows a cross-section through the container closure 9 illustrated in FIG. 9.

The container closure 9 comprises a spout 1 composed of a hollow-cylindrical spout part 3, a flange 2, as well as a film 8 welded to the flange 2. The container closure 9 further comprises a screw cover 10 having an inner thread 10b and an axis of rotation D and further comprises a cutting part 11 which is arranged within the spout part 3, wherein the cutting part 11 has an outer thread 11a and the spout 1 has an inner thread 7 which engage with one another and are configured such that the cutting part 11 moves, on the first time opening of the screw cover 10, by rotation in the direction of the axis of rotation towards the film 8, such that the cutting edges 11b penetrate into the film 8 separate this and thereby at least partly open it. The screw cover 10 comprises, as visible from the FIGS. 13, 14 and 16, an engagement part 10c, wherein the cutting part 11 and the screw cover 10 are configured mutually adapted with respect to one another, such that the engagement part 10c transfers a torque onto the cutting part 11. The same reference numerals refer to the same features in the FIGS. 10 to 14 and 16.

In an advantageous embodiment the container closure 9 is configured such that the engagement part 10c extends in the direction of extent of the axis of rotation D, and such that the cutting part 11 comprises a lug 11c for the reception of the engagement part 10c, wherein the lug 11c is configured such that the engagement part 10c is stored displaceable with respect to the lug 11c in the direction of extent of the axis of rotation D and in this connection forms a form-fitting connection on the formation of a longitudinal guide 11d.

The illustrated container closure 9 has the advantage that the engagement parts 10c are guided very well in the cutting part 11, which in turn brings about the advantage that the engagement parts 10c can be configured very thin and light and only have to have a relatively small stability, such that on the manufacture of the screw cover 10 and, in particular of the engagement parts 10c, material can be saved. Moreover, the container closure 9 in the assembled state forms a non-losable fixation.

Figure 15:
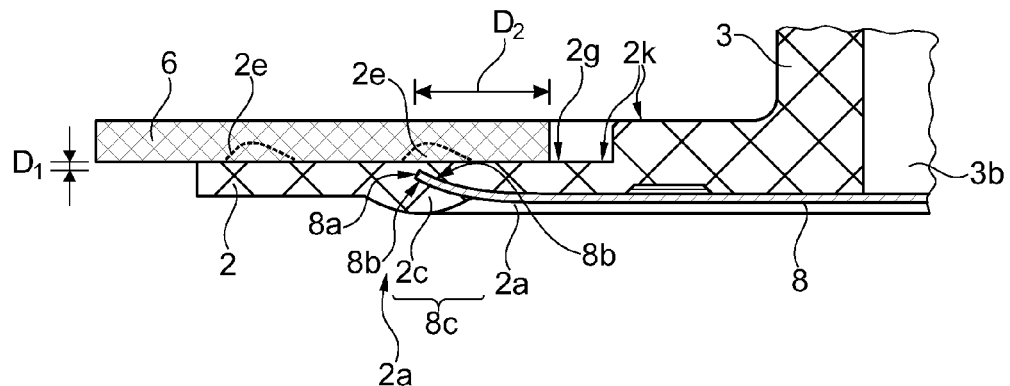
FIG. 15 a modified arrangement of the weld points with respect to FIG. 3.
Figure 16:
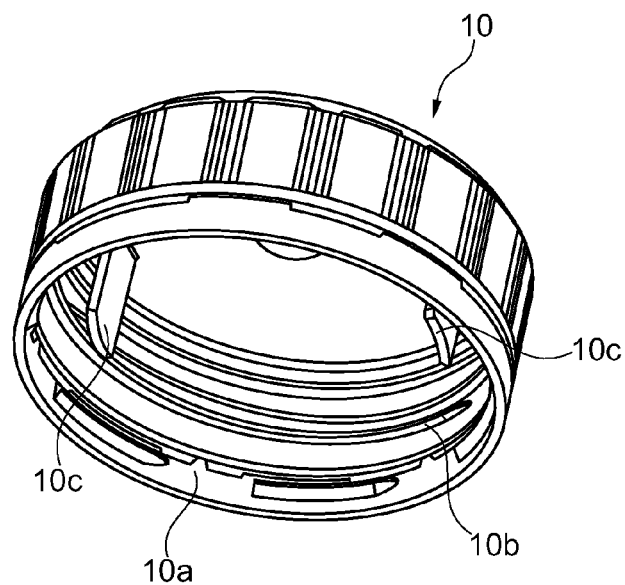
FIG. 16 a view of the screw cover from below.

In a detailed view, similar to that of FIG. 3, FIG. 15 shows a further embodiment of a weld 2a of the film 8 at the flange 2. In contrast to the embodiment illustrated in FIG. 3, the weld 2a, as well as the end section 8b of the film 8 are arranged displaced further to the right with respect to the hollow cylindrical spout part 3, such that a shorter distance D2 results. The flange 2 can then end after the weld 2a, or, as illustrated in FIG. 15, extend even further towards the periphery.

The spout 1 in accordance with the invention can also be combined with a plurality of differently designed screw covers 10 and cutting elements 11, which have the properties of closing the spout opening 3a from the outside and separating the film 8.

Figure 17:
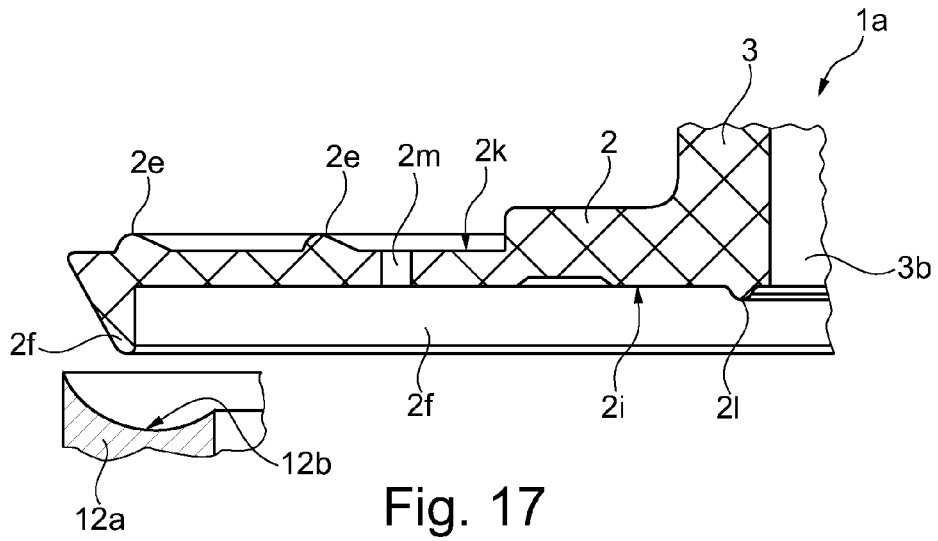
FIG. 17 a detailed view of a further embodiment of an intermediate product of a spout.

FIG. 17 shows a section through a further embodiment of an intermediate product 1a of a spout 1 prior to the welding of the film 8 similar to that illustrated in FIG. 5. In contrast to the embodiment in accordance with FIG. 5, the rear side 2i extends in a straight line. Moreover, the flange part 2 comprises a venting hole 2m which forms a fluid-conducting connection between the attachment side 2k and the rear side 2i. FIG. 17 further shows a section of a sonotrode 12a which forms a part of an ultrasonic welding apparatus. The sonotrode 12a has a form surface 12b. Also the intermediate product 1a illustrated in FIG. 5 could have a venting hole 2m.

Figure 18:
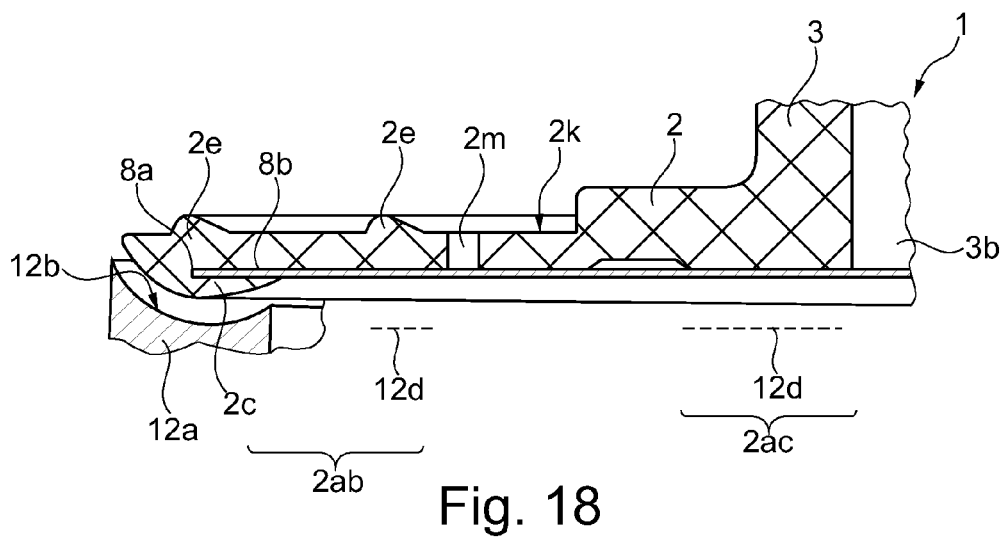
FIG. 18 a detailed view of a further spout.
Figure 19:
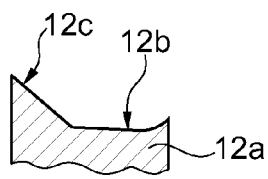
FIG. 19 a detailed view of a section of a sonotrode.

FIG. 18 shows the intermediate product 1a illustrated in FIG. 17 after the welding to the film 8, such that the spout 1 is formed comprising the film 8. For this purpose, for the arrangement illustrated in FIG. 17, the film is placed at the rear side 2i and thereafter the sonotrode 12a is guided towards the rear side 2i in order to first melt the projecting nose part 2f to a bead-shaped sealed part 2c by ultrasonic welding and then to deform this. The ultrasonic welding preferably takes place by means of a torsional welding method. However, also a longitudinal welding method could be employed. In FIG. 18 the sonotrode 12a is already partly retracted, such that the sealed part 2c is clearly visible. As illustrated, the form surface 12b of the sonotrode 12a advantageously determines the achieved extent of the sealed part 2c. Preferably, the form surface 2b is of curve-like design in order to achieve a bead-like sealed part 2c. The form surface 12b can, however, also be configured of different extent, for example as illustrated in FIG. 19. The form surface 12b always comprises a tilted and/or transverse, oblique or radially extending part surface 12c with respect to the extent of the attachment side 2k, in order to urge away the material of the projecting nose part 2f in the direction towards the inlet opening 3b, so that the nose part 2f, as illustrated in FIG. 18, is deformed to the sealed part 2c, such that the sealed part 2c covers the end section 8b also at the outer side.

The sonotrode 12 is preferably configured larger than illustrated and advantageously comprises further form surfaces 12d which are only illustrated by way of indication, in order to additionally form the first weld 2ac and to deform the energy directing actor 21 and/or to form the second weld 2ab. The hole 2m in this respect serves for the degasing of the space present between the first and second weld 2ac, 2ab, so that no air is enclosed between the rear side 2i and the film 8 and also that no air bubbles are formed.

In an advantageous embodiment material of the nose part 2f is urged in the direction towards the inlet opening 3b during the ultrasonic welding, so that the end section 8b is covered with material at the side remote from the rear side 2i and in this connection the sealed part 2c is formed, wherein the sealed part 2c is preferably of bead-like design.

In an advantageous method a sonotrode 12a has a form surface 12b having a part form surface 12c extending inclined and/or transverse, oblique or radially with respect to the extent of the attachment side 2k, wherein this part form surface 12c acts on the projecting nose part 12f in order to urge material of the nose part 12f away in the direction towards the inlet opening 3b. Such a part form surface 12c is illustrated in FIG. 19. Also the extent of the form surface 12b illustrated in FIGS. 17 and 18 on the left hand side has a non-illustrated, but clearly visible round extending part form surface 12c which urges the projecting nose part 2f away in the direction towards the inlet opening 3b.

The spout 1 in accordance with the invention and/or the container closure 9 in accordance with the invention is advantageously manufactured in a plurality of subsequently following method steps in that in a first method step the semi-finished product 1a illustrated, for example in FIG. 4, is produced and in that in a subsequent method step, as claimed, for example, in claim 13, the spout 1 is manufactured in that the film 8 is welded to the semi-finished product 1a and in that, as illustrated for example, in FIG. 10, the spout 1 is provided with a screw cover in a subsequently following method step. The container closure 9 can then be connected to a food container, for example, in a laminated package manufactured with a laminated layered material in order to produce an aseptic package.

The invention claimed is:

1. A spout comprising:
    a spout part having an inlet opening and a spout opening, and
    a flange part connected to the spout part,
    wherein the flange part has two sides, an attachment side as well as a rear side, wherein the attachment side is oriented towards the spout part and is provided for the attachment at a laminated package, wherein an oxygen impermeable film is arranged at the rear side of the flange part and is welded to the rear side such that the spout part is sealed towards the rear side only by the film, and wherein the film has an end section,
    wherein the flange part has a weld extending in its circumferential direction which weld is configured such that the end section is welded at the two sides in the flange part; and
    wherein the end section is arranged below the attachment side and the end section is arranged extending in the flange part, such that a spacing between the end section and the attachment side reduces in the direction towards a periphery of a flange part.

2. The spout in accordance with claim 1, wherein the thickness of the flange part reduces towards the periphery, such that the mutual spacing between the attachment side and the rear side reduces.

3. The spout in accordance with claim 1, wherein the end section extends tilted or curved with respect to the attachment side.

4. The spout in accordance with claim 1, wherein the film including the end section extends in parallel to the attachment side.

5. The spout in accordance with claim 1, wherein the end section ends at an end face and in that the spacing between the attachment side and the end face lies in the region of up to 0.5 mm.

6. The spout in accordance with claim 1, wherein the flange part is configured such that the laminated package welded to the attachment side and the film arranged at the rear side mutually overlap by a distance of at least 1 mm, preferably by a distance of up to 5 mm, with respect to the flange part in the radial direction.

7. The spout in accordance with claim 1, wherein the end section has an end face and in that the end section, as well as the end face of the film are welded to the flange part in gas-tight manner.

8. The spout in accordance with claim 7, wherein the weld, in which the end section is welded in from both sides, extending in the circumferential direction is configured as a bead-like sealed part.

9. A container closure comprising:
    a spout in accordance with claim 1, further comprising:
        a screw cover having an inner thread and an axis of rotation, and
        a cutting part which is arranged within the spout part, wherein the cutting part has an outer thread and the spout has an inner thread, which threads engage with one another and are configured such that the cutting part moves in the direction of the axis of rotation (D) towards the film on an opening of the screw cover,
        wherein the screw cover comprises an engagement part, and wherein the cutting part and the screw cover are configured mutually adapted such that the engagement part transfers a torque onto the cutting part.

10. The container closure in accordance with claim 9, wherein the engagement part extends in the direction of extent of the axis of rotation (D); in that the cutting part has a lug for receiving the engagement part, wherein the lug is configured such that the engagement part is displaceably stored with respect to the lug in the direction of extent of the axis of rotation (D) and in this connection a form-fitting connection is formed.

11. A semi-finished product for a spout in accordance with claim 1, comprising
    a spout part having an inlet opening and an outlet a spout opening, and
    a flange part connected to the spout part,
    wherein the flange part has two sides, an attachment side as well as a rear side,
    wherein the attachment side is orientated towards the spout part and is provided for the attachment to a laminated package, wherein the rear side has a nose extending along its periphery in the circumferential direction and projecting over the rear side,
    wherein a film, which also covers the inlet opening, is arranged in a region of the rear side enclosed by the nose part, wherein the film has an end section directed towards the nose part and wherein the nose part is transformed to a sealed part such that the sealed part encloses the end section in the circumferential direction and the end section of the film is welded at both the two sides in the flange part; and
    wherein the end section is arranged below the attachment side and the end section is arranged extending in the flange part, such that a spacing between the end section and the attachment side reduces in a direction towards a periphery of the flange part.

12. The semi-finished product in accordance with claim 11, wherein the rear side has a thinnest point at which the spacing between the attachment side and the rear side has the smallest value and in that, opposite the thinnest point, the attachment side has an energy directing actor projecting beyond the attachment side.

13. The spout in accordance with claim 1, wherein the flange part has a first weld connecting the film to the rear side, wherein the first weld is arranged in the region of the inlet opening and extends over the overall circumference of the rear side.

14. The spout in accordance with claim 13, wherein this has a second weld connecting the film to the rear side, wherein the second weld is arranged with respect to the end section and extends over the overall circumference of the rear side.

15. The spout in accordance with claim 14, wherein the flange part has a venting hole between the first weld and the second weld which venting hole forms a fluid conducting connection between the attachment side and the rear side.

16. A method of manufacturing a spout, comprising
a spout part having an inlet opening, as well as having a spout opening, and
a flange part connected to the spout part,
wherein the flange part has two sides, an attachment side as well as a rear side, wherein the attachment side is oriented towards the spout part,
wherein a nose part is arranged at the rear side, said nose extending in the circumferential direction and projecting over the rear side,
wherein a film, which also covers the inlet opening, is arranged in a region of the rear side enclosed by the nose part, wherein the film has an end section directed towards the nose part and wherein the nose part is transformed to a sealed part such that the sealed part encloses the end section in the circumferential direction and the end section of the film is welded at the two sides in the flange part; and
wherein the end section is arranged below the attachment side and the end section is arranged extending in the flange part, such that a spacing between the end section and the attachment side reduces in a direction towards a periphery of the flange part.

17. The method in accordance with claim 16, wherein the flange part is generated with a thickness reducing towards the nose part such that the spacing between the film and the attachment side reduces at least in the region of the sealed part for a welded film.

18. The method in accordance with claim 17, wherein the rear side is formed with a surface extending curved in a direction towards the nose part.

19. The method in accordance with claim 16, wherein the welding is carried out with ultrasound, in order to bring about a gas-tight connection in the sealed part between the end section of the film and the flange part.

20. The method in accordance with claim 19, wherein material of the nose part is urged in a direction towards the inlet opening during the ultrasonic welding, such that the end section is covered with material at the side remote from the rear side and, in this connection, the sealed part is formed, wherein the sealed part is preferably configured as a bead-shaped.

21. The method in accordance with claim 20, wherein a sonotrode has a form surface having a part form surface extending tilted and/or extending transverse, oblique or radial with respect to an extent of the attachment side and in that this part form surface acts on the projecting nose part in order to urge material of the nose part away in a direction towards the inlet opening.

* * * * *